United States Patent

Hestad

[15] 3,666,892

[45] May 30, 1972

[54] SPEECH GATE

[72] Inventor: Alfred M. Hestad, Chicago, Ill.

[73] Assignee: International Telephone and Telegraph Corporation, New York, N.Y.

[22] Filed: May 13, 1970

[21] Appl. No.: 36,785

[52] U.S. Cl. ............................179/77, 179/18 GF, 307/255, 307/259

[51] Int. Cl. ..........................................................H04q 1/28

[58] Field of Search ...........179/16 A, 16 AA, 18 AD, 18 EB, 179/18 F, 18 FA, 27 A, 27 CA, 77; 307/256, 257, 259

[56] References Cited

UNITED STATES PATENTS 3,136,863 6/1964 Melvin..............................179/18 FA 3,437,909 4/1969 Walker.................................307/256

3,249,698 5/1966 Benmussa et al....................179/18 F 3,617,771 11/1971 Lee.......................................307/259

*Primary Examiner*—William C. Copper

*Assistant Examiner*—Randall P. Myers

*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

An audio frequency gate is disclosed for use in an electronic PABX. In particular, the gate enables the efficient transmission of speech and multi-frequency tones between components which are controlled by dc potentials without disrupting associated dc controls.

8 Claims, 3 Drawing Figures

INVENTOR.
ALFRED M. HESTAD
BY
Delbert D. Warner
ATTORNEY

SPEECH GATE

This invention relates to speech gates and particularly to gates which permit the passage of both speech and multi-frequency tones.

The invention is not limited to any particular switching system. However, it has particular utility with a PNPN diode switching system utilizing a network of the type disclosed by V. E. Porter in U.S. Pat. No. 3,204,044 granted on Aug. 31, 1965. It has utility also with a PNPN diode switching system of the type disclosed in the application of Nicola Jovic, Ser. No. 584,140 filed on Oct. 14, 1966, and entitled "Multi-Stage Electronic Switching Network" and assigned to the same assignee as the present invention.

The prior art gates for electronic PABXs of the kind disclosed by Porter and Jovic were designed for use with germanium transistors in a system employing dial pulses. Such gates were relatively simple, since simple gated circuits connected in series sufficed to provide a path for the dial pulses. The use of solid state silicon devices together with multi-frequency dialing has brought changes such that the prior art gates are inadequate.

Accordingly, it is an object of the present invention to provide an improved speech gate for use with an electronic PABX. It is a related object of this invention to provide an improved speech gate which can accept and transmit speech and other multi-frequency signals in conjunction with an electronic PABX.

In order to accomplish the foregoing objects and others ancillary thereto, a speech gate in accordance with the present invention is coupled to a pnpn diode matrix. The speech gate may in some cases be coupled between an originate and a terminate side of a junctor and in others between other switching components such as a transfer junctor, or a register, and a trunk circuit. The speech gate is enabled to transmit audio frequency signals in both directions over a diode which is kept saturated by being coupled between a constant current source and a current sink.

Figure 3:
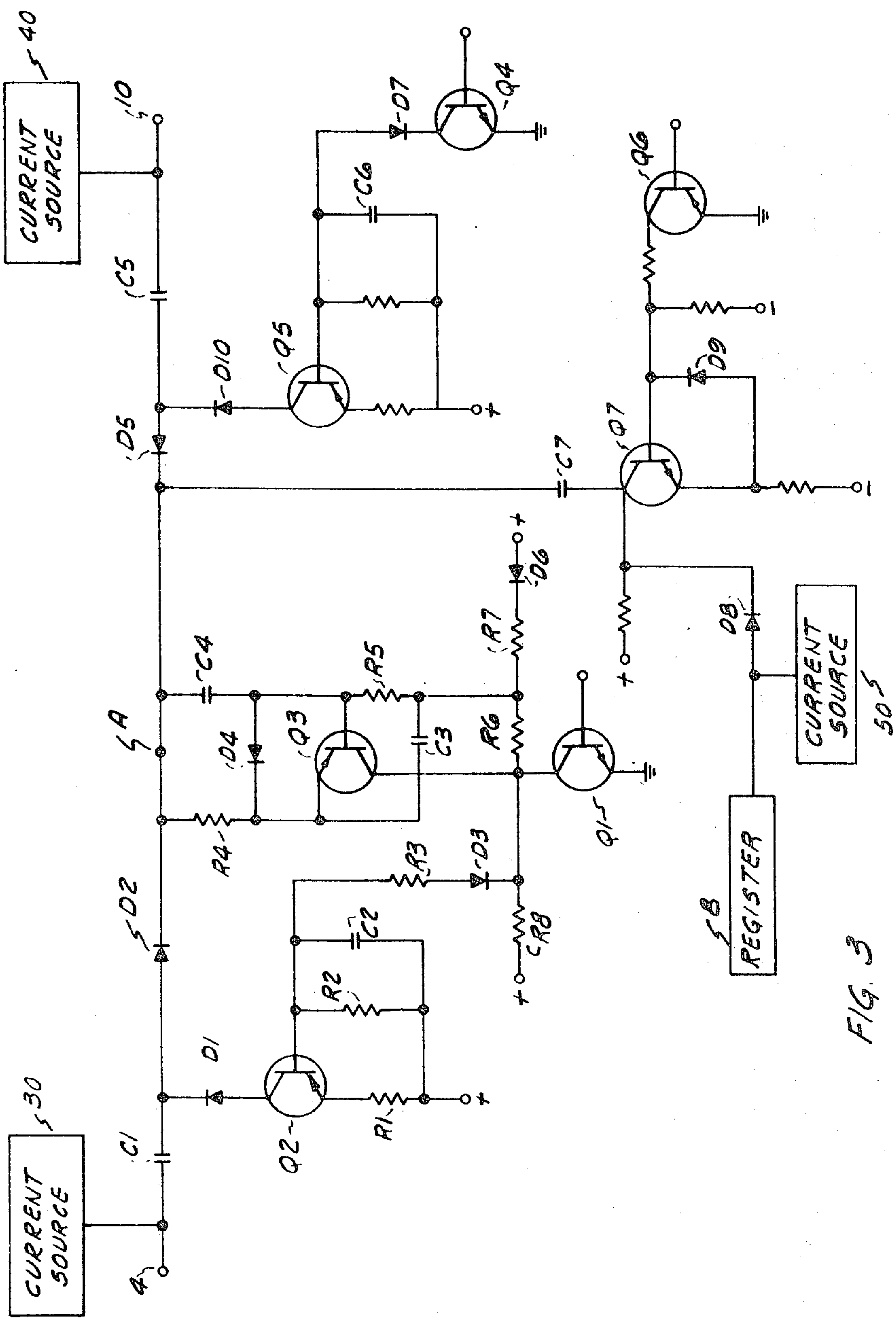
Figure 1:
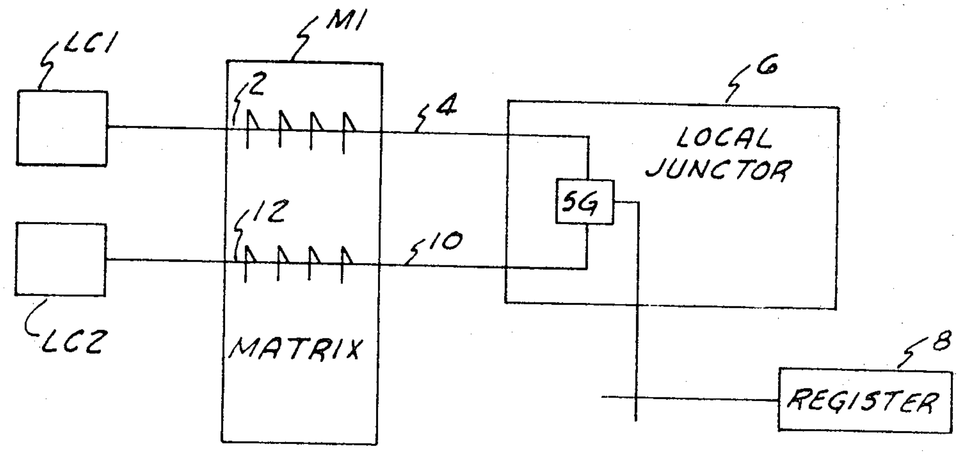
Figure 2:
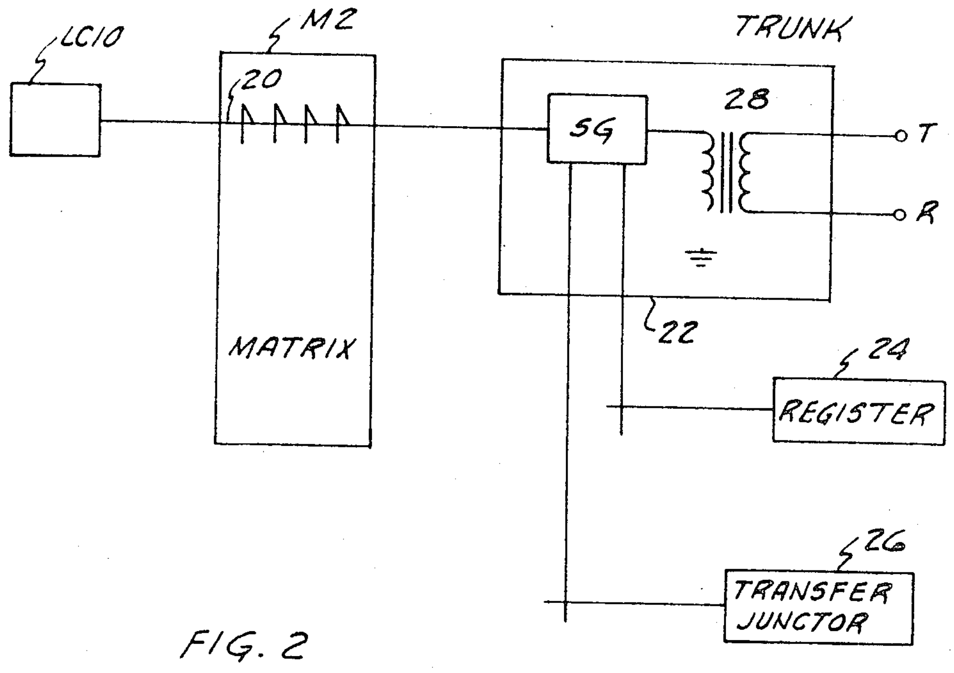

The above mentioned and other features and objects of this invention and the manner of obtaining them will become more apparent, and the invention itself will be best understood by reference to the following description of an embodiment of the invention taken in conjunction with the accompanying drawings, in which:

FIG. 1 is a block diagram showing relationships between the present invention and operating circuits of a telephone switching system, FIG. 2 is a block diagram showing relationships between a further embodiment of the present invention and other operating circuits, and FIG. 3 is a detailed schematic showing an embodiment of the invention.

Turn to FIG. 1 for a block diagram showing the use of a speech gate, according to the present invention, between the originate side and the terminate side of a matrix employing four-layer diodes, or pnpn diodes. It will be recognized that the showing of FIG. 1 and the following description are intended merely to provide general information as to the manner of use of the speech gate and are not represented to be a discussion of a complete telephone system.

In FIG. 1, a block labeled LC1 has been selected to represent the line circuit of a calling party. When the calling party goes off-hook, the line circuit is connected over path 2 through the matrix M1 and over a path 4 to a local junctor at 6, a speech gate SG, and a register at 8. The calling party dials the called party's number into the register. The number in the register is then used in selecting paths 10 and 12 to connect the line circuit of the called party, represented by block LC2, to the local junctor.

FIG. 2 shows, in a similar way, the use of a speech gate in a trunk circuit. In this example, a line LC10 is connected through a matrix M2 over a pnpn diode path 20 to a trunk circuit 22 and to either a register 24 or a transfer junctor 26. Following suitable and conventional switching operations involving register 24 or junctor 26, a connection is then terminated to a transformer 28 and over tip and ring connections T and R to a central dial office CDO (not shown). When this connection is completed the calling party connected to LC10 can talk to the called party through the speech gate and the CDO.

SPEECH GATE

A speech gate circuit in accordance with the present invention is shown in FIG. 3.

In FIG. 3, the originate connection from the matrix M1 is shown at 4 and the terminate connection to the matrix is shown at 10. As was indicated in the discussion of FIG. 1 a connection is established from a calling party through a pnpn diode matrix to a terminal 4. This connection is held by the constant current source of negative polarity indicated at 30. As was also indicated in FIG. 1, a further connection is completed to the register 8. Subsequently, the register 8 drops out and a connection is completed between terminals 4 and 10. It will be recognized that the operation of the register is under control of means which are not illustrated, since they form no part of this invention.

From the foregoing, it is clear the speech gate includes means over which the originate side of the junctor may be connected first to the register and then to the terminate side of the junctor for audio transmission. Transmission of audio signals in both direction through the gate is accomplished over diodes D2 and D5 which are biased to saturation. Saturation of the diodes D2 and D5 without disrupting the circuits is accomplished by connecting the diodes between constant current sources and current sinks. The capacitors C1 and C5 provide DC isolation such that the DC current through the matrix from sources 30 and 40 is not changed when the speech gate is activated. Similarly, the current source 50 of negative polarity which energizes diodes in the register 8 is blocked by D8 from a current source formed by Q7, and associated components.

The speech gate is switched on or is activated by switching on the transistors Q1 and Q4 (through means not shown). At this time, transistor Q2 in response to a signal from Q1, in association with the illustrated components and bias potentials, forms a constant current source. Transistor Q2 is not saturated and therefore there is a high ac impedance between the collector and the emitter. The current flows through Q2 via D1, D2, R4, Q3 and Q1 to ground.

Transistor Q3 forms a "current sink." This circuit is connected into the transmission path and serves the purpose of sinking the current which flows via D2 to ground without attenuating the ac signals transmitted over the bridge. Transistor Q3 is biased via various resistors such as R5, R6, R7, R8 and the biasing potentials to operate in the active region (unsaturated).

When an ac signal appears at node A this signal is coupled via C4 to the base of Q3. This ac signal is also coupled via the base emitter junction of Q3 causing nearly the same signal to appear at the emitter of Q3 as that appearing at node A. The ac signal appearing on the emitter of Q3 is also coupled via C3 causing almost zero ac signal to appear across R5. This in turn means that transistor stage Q3 presents a high ac impedance to the ac signals transmitted through mode Aa.

Transistor stage Q5 forms a constant current source similar to stage Q2. Q5 in conjunction with the current sink Q3 therefore maintains D5 saturated to enable audio signals to pass through D5 in both directions.

When the junctor is connected to the register the stages Q6 and Q7 are activated. Transistor stage Q7 forms a constant current source which when activated causes current to flow via diode D8 into the register, saturating D8, and thereby providing a two-way transmission bridge to the register. It will be recognized also that a transfer junctor, such as 26 in FIG. 2, may be employed in place of the register in a suitable case.

While the principles of the invention have been described above in connection with specific apparatus and applications, it is to be understood that this description is made only by way of example and not as a limitation on the scope of the invention.

I claim:

1. An audio frequency gate for use in transmitting both speech and multi-frequency tones between dc controlled components of an electronic PABX, comprising a constant current source, a current sink, means connecting a diode between a first terminal coupled to said constant current source and a second terminal coupled to said current sink, and first switching means coupled to energize said constant current source and said current sink, causing them to bias the diode to a saturated state, said diode functioning in said saturated state to transmit audio frequency signals in both directions between said first and second terminals.

2. An audio frequency gate as claimed in claim 1 including a second constant current source, a second diode, means connecting said second diode between a third terminal coupled to said second constant current source and said second terminal coupled to said current sink, and second switching means for energizing said second constant current source, enabling it to saturate the second diode and enable the second diode to transmit audio frequency signals in both directions between the second and third terminals.

3. An audio frequency gate as claimed in claim 1 including a third constant current source, a third diode, a register, a fourth terminal means connecting said third constant current source to said third diode and through the diode to said register, and third switching means for energizing said third constant current source, enabling it to saturate the third diode and enable the third diode to transmit audio frequency signals in both directions between the fourth terminal means and said register.

4. An audio frequency gate as claimed in claim 1, in which dc isolation means are employed to connect said first terminal to a pnpn diode matrix to accept voice frequency signals originating from and going to said matrix.

5. An audio frequency gate as claimed in claim 2, including a pnpn diode matrix, and dc isolation means employed to connect each of said first and third terminals to respective separate circuits of the pnpn diode matrix to enable two-way voice frequency signals to pass serially through the two circuits of the matrix.

6. An audio frequency gate as claimed in claim 3 including dc isolation means connecting the third terminal to a pnpn diode matrix, said connections enabling multi-frequency signals to be received through the matrix to and from the register.

7. An audio frequency gate as claimed in claim 2, including a third constant current source, a third diode, a transfer junctor, fourth terminal means connecting said third constant current source through said third diode to said transfer junctor, and third switching means for energizing said third constant current source, enabling it to saturate the third diode and enable the third diode to transmit audio frequency signals in both directions between the fourth terminal and the transfer junctor.

8. An audio frequency gate as claimed in claim 7, including dc isolation means connecting the first terminal to a pnpn diode matrix to enable multi-frequency signals to be received through the matrix to and from the transfer junctor.

* * * * *